(12) United States Patent
Lazar

(10) Patent No.: US 10,185,162 B2
(45) Date of Patent: Jan. 22, 2019

(54) SINGLE LENS GLARE-REDUCING EYEWEAR WITHOUT CAUSING LCD SCREEN BLACKOUT

(71) Applicant: 5.11, Inc., Modesto, CA (US)

(72) Inventor: Adam North Lazar, Westlake Village, CA (US)

(73) Assignee: 5.11, INC., Modesto, CA (US)

(*) Notice: Subject to any disclaimer, the term of this patent is extended or adjusted under 35 U.S.C. 154(b) by 0 days.

(21) Appl. No.: 15/261,642

(22) Filed: Sep. 9, 2016

(65) Prior Publication Data

US 2016/0377889 A1 Dec. 29, 2016

Related U.S. Application Data

(63) Continuation-in-part of application No. PCT/US2015/018731, filed on Mar. 4, 2015.

(60) Provisional application No. 61/948,340, filed on Mar. 5, 2014.

(51) Int. Cl.
*G02C 7/12* (2006.01)
*G02B 1/08* (2006.01)
*G02C 7/10* (2006.01)

(52) U.S. Cl.
CPC ............... *G02C 7/12* (2013.01); *G02B 1/08* (2013.01); *G02C 7/10* (2013.01)

(58) Field of Classification Search
CPC .............. G02B 1/08; G02C 7/12; G02C 7/10
USPC ............................................. 351/49, 44, 41
See application file for complete search history.

(56) References Cited

U.S. PATENT DOCUMENTS

| | | | |
|---|---|---|---|
| 3,782,810 A * | 1/1974 | Marker | A61F 9/025 2/432 |
| 7,051,290 B2 * | 5/2006 | Foreman | B29C 33/0038 264/1.1 |
| 7,854,506 B1 | 12/2010 | Johnson et al. | |
| 2005/0264753 A1 | 12/2005 | Hartley et al. | |
| 2011/0063569 A1 | 3/2011 | Miyoshi et al. | |
| 2013/0329184 A1 | 12/2013 | Barzak et al. | |
| 2014/0029096 A1 | 1/2014 | Kessler et al. | |

OTHER PUBLICATIONS

PCT/US2015/018731, "International Search Report and Written Opinion," dated Jun. 18, 2015, 8 pages.
Wiley X, Inc., "Wiley X Eyewear + Gloves," Tactical Catalog, available at: <https://www.wileyx.com/catalogs/pdfs/Tactical_Catalog.pdf>, 2015, 36 pages.
"Polarized 3D System," Wikipedia, available at: http://en.wikipedia.org/wiki/Polarized_3D_system, 8 pages.
"Polarizing Filter (photography)," Wikipedia, available at: http://en.wikipedia.org/wiki/Polarizing_filter_(photography), 4 pages.

(Continued)

*Primary Examiner* — Tuyen Tra
(74) *Attorney, Agent, or Firm* — Kilpatrick Townsend & Stockton LLP

(57) ABSTRACT

Glasses (e.g., goggles) for tactical use comprise a single lens. The single lens has a substrate, a quarter-wave retarder, and a linear polarizer. The substrate provides impact protection. The quarter-wave retarder and the linear polarizer provide glare reduction without causing blackout of screens having linear polarization.

20 Claims, 4 Drawing Sheets

(56) References Cited

OTHER PUBLICATIONS

Polarized Lenses—Oakley HD Polarized Lenses, available at: http://www.oakley.com/innovation/optical-superiority/polarized/clarity, 11 pages.
"Why are My Sunglasses Polarized Diagonally?" Ask MetaFilter, available at: http://ask.metafilter.com/42401/Why-are-my-sunglasses-polarized-diagonally, Jul. 18, 2006, 9 pages.

\* cited by examiner

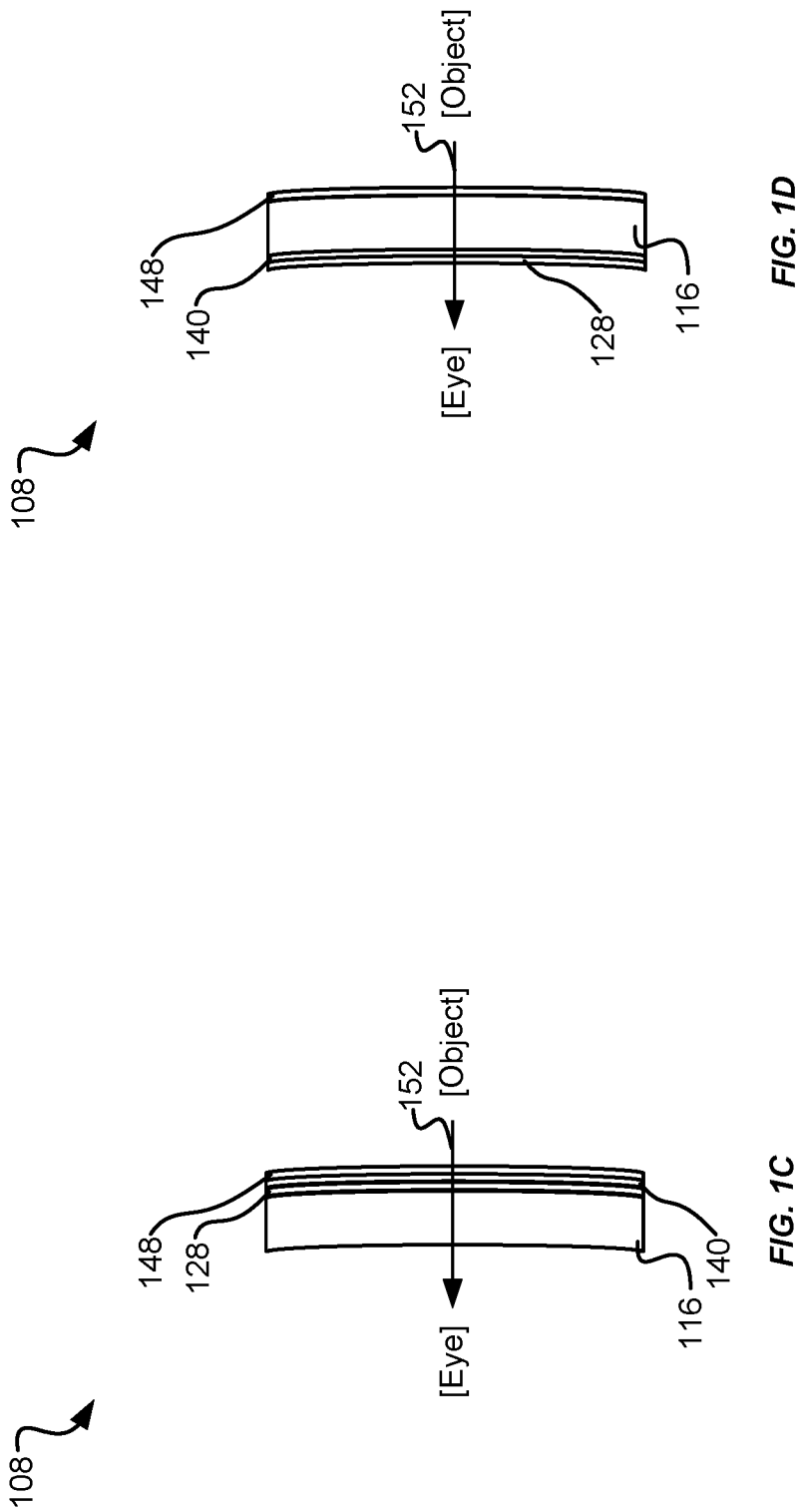

SINGLE LENS GLARE-REDUCING EYEWEAR WITHOUT CAUSING LCD SCREEN BLACKOUT

CROSS-REFERENCES TO RELATED APPLICATIONS

This application is a continuation-in-part of International Application No. PCT/US2015/018731, filed on Mar. 4, 2015, which application claims the benefit of U.S. 61/948,340, filed Mar. 5, 2014, the contents of each are incorporated by reference in their entirety for all purposes.

BACKGROUND

This disclosure relates to sunglasses, and in particular to polarized sunglasses. Linear polarizers are used in sunglasses to reduce glare. Reflections off some surfaces, such as ponds or lakes, are horizontally polarized. To reduce glare caused by horizontally-polarized reflections, some sunglasses use a vertical-polarizing film.

BRIEF SUMMARY

In some embodiments, a pair of sunglasses comprises a frame, a first ocular, and a second ocular. The frame has a horizontal axis. Each ocular comprises a substrate. On a front of the substrate (where a back of the substrate is to a wearer's eye) is a linear polarizer with a transmission axis. On the front of the linear polarizer is a quarter-wave plate (sometimes referred to as a retarder and/or a quarter-wave retarder) having a fast axis (sometimes referred to as an optical axis). The fast axis of each ocular is oriented at the same angle in relation to the horizontal axis. The transmission axis of each ocular is oriented at the same angle in relation to the horizontal axis and/or in relation to the fast axis. In some embodiments, the fast axis forms a 45 degree angle with the horizontal axis. In some embodiments, the fast axis of each ocular is oriented 45 degrees in relation to the transmission axis. In some embodiments, the quarter-wave retarders of each ocular have a similar orientation (e.g., within 1, 3, or 5 degrees).

In some embodiments, eye protection comprises a frame and a single lens. The single lens comprises a substrate (e.g., for impact resistance to protect eyes of a user, the substrate being made of polycarbonate); a linear polarizer, characterized by a transmission axis; and a quarter-wave retarder, characterized by a fast axis. The substrate has a first surface and a second surface opposite the first surface. The linear polarizer is between the first surface of the substrate and the quarter-wave retarder. The fast axis makes a non-zero angle with the transmission axis. In some embodiments, the single lens further comprising a film directly adjacent to the quarter-wave retarder, wherein the quarter-wave retarder is between the film and the linear polarizer, the film is a hardcoat, and/or the film has an air interface. The film isn't made of polycarbonate; the film doesn't provide structural support for the single lens. In some embodiments, the film has a thickness between 2 and 10 μm. In some embodiments, the substrate is the only part of the single lens made of polycarbonate. In some embodiments, the substrate has a thickness equal to or greater than 1.8, 2.0, or 2.2 mm and equal to or less than 2.2, 2.4, or 3.5 mm. In some embodiments, the single lens has a first field of view for a first eye of a user and a second field of view for a second eye of the user; the first field of view and the second field of view are partially overlapping. In some embodiments, the single lens has width ranging from 5.5 inches to 10 inches (e.g., to cover both eyes of a user).

In some embodiments, a method for using eye protection is disclosed. The method comprises providing eye protection and positioning the eye protection in relation to a user. The eye protection comprises a single lens. The single lens comprises a substrate, a quarter-wave retarder, and a linear polarizer. The eye protection of positioned in relation to the user such that: both eyes of the user look through the single lens; light traveling to the user is transmitted through the quarter-wave retarder of the single lens; light traveling to the user, after transmitting through the quarter-wave retarder, is transmitted through the linear polarizer of the single lens; and light traveling to the user is transmitted through the linear polarizer before entering an eye of the user.

In some embodiments, eye protection comprises a frame and a lens coupled with the frame. The lens comprises a substrate, a linear polarizer characterized by a transmission axis, and a quarter-wave retarder characterized by a fast axis. The substrate comprises a first surface and a second surface. The substrate is made of polycarbonate. The linear polarizer is between the first surface of the substrate and the quarter-wave retarder. The fast axis makes a non-zero angle with the transmission axis. A film is directly adjacent to the quarter-wave retarder, wherein the quarter-wave retarder is between the film and the linear polarizer. The film has an air interface (e.g., opposite from an interface with the quarter-wave retarder). In some embodiments, a coating covers the second surface of the substrate; the coating is equal to or less than 50 μm; and the coating has an air interface. In some embodiments, the second surface of the substrate is an air interface. In some embodiments, the film is a hardcoat.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

FIGS. 1C and 1D depict simplified side views of embodiments of an ocular.

Figure 1A:
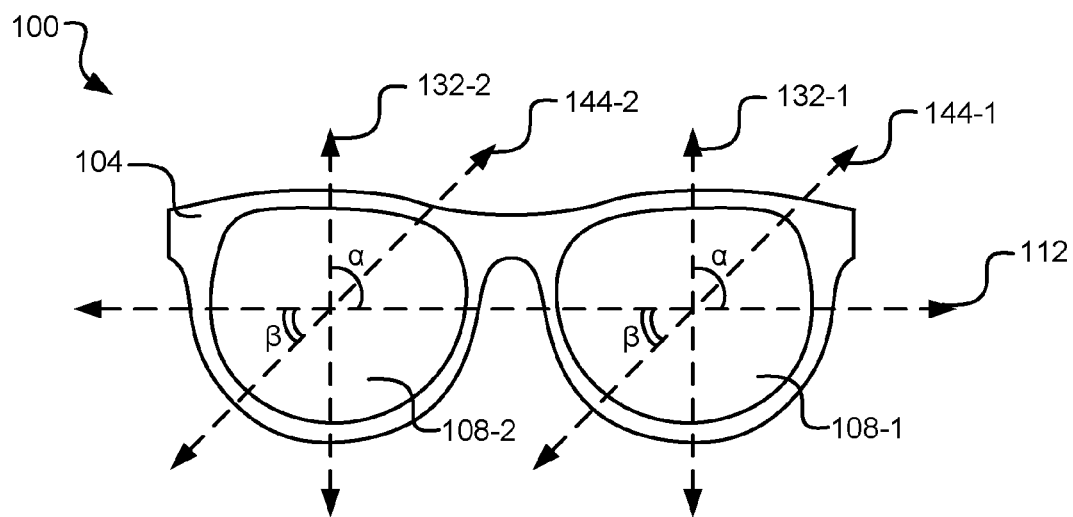
FIG. 1A depicts a simplified front view of an embodiment of glasses having two oculars.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Polarized sunglasses available in the marketplace make use of a linear-polarizing filter embedded in a lens system to provide glare elimination coming from light reflecting surfaces such as water, snow, glass windows, and asphalt roads. Modern linear-polarized filters have a plastic layer, normally polyvinyl acetate (PVA) impregnated with iodine molecules, which has long chain polymer molecules aligned along a particular direction called a polarization axis. The direction perpendicular to the polarization axis is called a transmission axis of the polarizer. Therefore, light coming out of the polarizer is linearly polarized in a direction parallel to the transmission axis.

In some applications, a drawback of linear-polarizing sunglasses is that the linear-polarizing sunglasses cannot be used effectively with an LCD (liquid crystal display) screen. Light from an LCD screen is usually linearly polarized. LCD screens use a pair of crossed linear polarizers. Thus linear-polarizing sunglasses tend to blackout the LCD screen when the transmission axis of the linear polarizer is orthogonal to linearly-polarized light from the LCD screen (e.g., when a viewer tilts his/her head at a certain angle in relation to the LCD screen). LCD screens are found in instrumentation, navigation, guidance, office phones, tablets, computer screens, and tactical communication instruments. Blackout of a display during a tactical situation (e.g., a police or military action) can cause delays. In some situations, a delay can make the difference between success and failure of an action. By using an optical retarder before a linear polarizer, blackout from multiple displays can be reduced while also reducing glare from certain reflections.

The reason for blackout of the LCD screen is related to a relative orientation of polarizing axes of both a polarizer of the LCD screen and the linear polarizer of the sunglasses. When the polarizing axes angles are off, light coming from the LCD screen tends to be absorbed by the linear polarizer of the sunglasses. Normally, a complete blackout will occur at a certain angle, for example, when the polarizing axis of the LCD screen is orthogonal, or nearly orthogonal, to the polarizing axis of the sunglasses. In some embodiments orthogonal is 90 degrees plus or minus 1%. In some embodiments, nearly orthogonal is 90 degrees plus or minus 2%, 3%, and/or 5%.

In some embodiments, an optical retarder and a linear polarizer are used in eye protection (e.g., sunglasses, goggles, and visors) instead of just a linear polarizer. Adding the optical retarder helps avoid LCD screen blackout. Circular-polarizing films are not currently utilized in sunglasses, especially in an orientation with a quarter-wave plate on the outside (e.g., away from a user) of a lens due to a) low efficiency at reducing glare light as compared to linear-polarizing films, b) limitations as to placement within a lens structure of eyewear, and/or c) they are not easily shaped into a curved surface while maintaining optical performance by controlling the orientation of the polarization axis.

A circular polarizer comprises, and in some embodiments consist of, a linear-polarizing filter laminated with an optical retarder (e.g., a quarter-wave plate), which converts linearly-polarized light to circular-polarized light. The result is that the wearer of linear-polarizing eyewear is able tilt his/her head when looking at an LCD screen without image loss and/or blackout occurrence.

An optical retarder produces a phase shift between two perpendicular components (e.g., ordinary wave (o-wave) and extraordinary wave (e-wave)) of incident light. Retarders do not linearly polarize un-polarized light, and in some embodiments do not reduce the intensity of the incident light. In some embodiments, a quarter-wave retarder is preferred over other retarders to convert linear polarization into circular polarization and vice-versa. To produce circular polarization, a linear polarizer first polarizes light at a 45 degree angle to a fast axis of a quarter-wave plate. The quarter-wave plate then introduces a 90 degree phase shift between the two perpendicular components of the light transmitted through the linear polarizer. The 90 degree phase shift converts linearly-polarized light into circular-polarized light.

Circular-polarizing films have been used in camera lenses. Circular-polarizing films are used in camera lenses so that a linear polarizer does not interfere with auto-focus and/or light-metering sensors of the camera (e.g., a light meter in a single lens reflex (SLR) camera uses a beam splitter that is sensitive to linear polarization). Circular-polarizing films used in camera lenses cause blackout of an LCD screen because of the position of the linear polarizer with respect to the quarter-wave plate. The circular-polarizing film of a camera lens is positioned so that light is first incident on the linear polarizer of the circular-polarizing film. After light is transmitted through the linear polarizer, light is transmitted to the quarter-wave plate of the circular-polarizing film.

To reduce blackout of an LCD screen, some embodiments of the instant application position the quarter-wave retarder so that light is first incident on the quarter-wave retarder and then incident on the linear polarizer. Thus the glasses 100 transmit linear-polarized light to the user, not circular-polarized light. Positioning the quarter-wave retarder in front of the linear polarizer for a camera would render the circular-polarizing film unfit for the intended use with the camera.

Circular-polarizing systems have been used for 3D viewing. Glasses for 3D viewing use two quarter-wave retarders, one for each eye of a wearer, with orthogonal orientations. Modifying 3D glasses to have a single lens, or to have two quarter-wave retarders with similar orientations, would render the 3D glasses unfit for their intended purpose because the wearer would no longer see a 3D image.

Figure 1B:
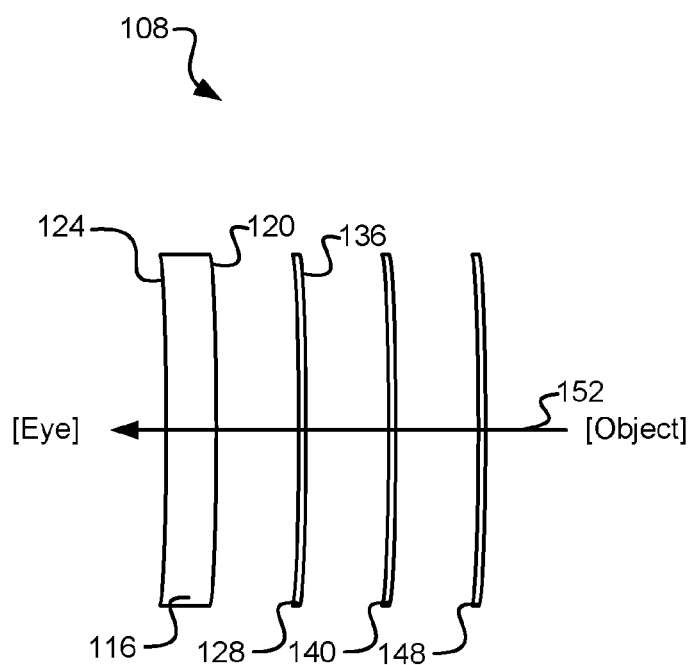
FIG. 1B depicts a simplified expanded view of an embodiment of an ocular.

Referring first to FIG. 1A, a front view of an embodiment of glasses 100 is shown. The glasses 100 comprise a frame 104, a first ocular 108-1, and a second ocular 108-2. The frame 104 has a horizontal axis 112. FIG. 1B depicts a simplified expanded view of an embodiment of an ocular 108. FIG. 1C depicts a simplified side view of an embodiment of an ocular 108. Each ocular 108 comprises a substrate 116 (e.g., polycarbonate lens, polyurethane lens, or other high-impact resistant transparent material). On a front 120 side (e.g., convex side) of the substrate 116 (a back 124 of the substrate 116 is to a wearer's eye) is a linear polarizer 128 with a transmission axis 132. The transmission axis 132 makes a first angle $\alpha$ with respect to the horizontal axis 112. On a front 136 side of the linear polarizer 128 (e.g., directly adjacent) is a quarter-wave plate 140 having a fast axis 144. The fast axis 144 makes a second angle $\beta$ in relation to the horizontal axis 112. In some embodiments, the first ocular 108-1 has a first transmission axis 132-1 oriented at the first angle $\alpha$ with respect to the horizontal axis 112 and the second ocular 108-2 has a second transmission axis 132-2 oriented at the first angle $\alpha$ with respect to the horizontal axis 112. In some embodiments, the first ocular 108-1 has a first fast axis 144-1 oriented at the second angle $\beta$ with respect to the horizontal axis 112 and the second ocular 108-2 has a second fast axis 144-2 oriented at the second angle $\beta$ with respect to the horizontal axis 112. In some embodiments: $\alpha=90°$, $\alpha-\beta=45°$, and/or $\beta=45°$. In some embodiments $\beta-\alpha=45°$ and $\beta=135°$. In some embodiments, the transmission axis 132 of each ocular 108 is oriented at the same angle (e.g., +/−5° and/or +/−10°) in relation to the horizontal axis 112 and/or in relation to the fast axis 144. In some embodiments, β<45° while keeping β−α=45°; in some embodiments, |α−β|<45° to reduce reflections and/or blackout of displays emitting circularly-polarized light.

In some embodiments, the quarter-wave plate 140 is in front of the linear polarizer 128, otherwise, blackout could still occur. In some embodiments, each ocular 108 is oriented similarly (e.g., similar transmission axis 132 and/or fast axis 144) to reduce variances in light transmission through each ocular 108, and, subsequently, to reduce variations in images formed in each eye.

FIG. 1B further shows a direction of light travel 152. Light travels from an object, through a film 148, then through the quarter-wave plate 140, then through the linear polarizer 128, then through the substrate 116, then to an eye of a wearer of the glasses 100. In some embodiments, light travels from the object, through the film 148, then through the substrate 116, then through the quarter-wave plate 140, then through the linear polarizer 128, and then to the eye of the wearer of the glasses 100 (e.g., FIG. 1D). In some embodiments, an arrangement similar to the embodiment in FIG. 1D is used to modify sunglasses manufactured by others. In some embodiments, the film 148 is not used.

In some embodiments, the substrate 116 is an optically-correct, injection-molded or cast lens that meets safety impact ratings for optics and/or impact. In some embodiments, the substrate 116 is tintable to a color, or a subset of colors, by injection molding or casting or other manufacturing technique for making an optically-transparent lens. In some embodiments, the film 148 is placed in front of the ocular 108 to eliminate and/or reduce perceived birefringence to a wearer without compromising the structural integrity of the ocular 108 (e.g., placing a film 148 between the quarter-wave plate 140 and the linear polarizer 128 may cause a wearer to see various colors caused by birefringence properties of the film 148). In some embodiments, the film 148 is applied as a protective coating to provide abrasion, chemical, and/or corrosion resistance. In some embodiments, the film 148 is an antireflective coating, an anti-fog coating, and/or a mirror coating. In some embodiments, more than one film 148 is applied (e.g., an anti-fog coating on an inside surface of the ocular 108, nearest to a wearer's eye, and a hardcoat on an outside surface of the ocular 108, farthest from the wearer's eye).

In some embodiments, the glasses 100 do not interfere with viewing other gear/equipment (e.g., various screens, such as LCD screens) and provide a wearer with impact protection (e.g., for tactical situations). In some embodiments, the oculars are tinted. In some embodiments, the oculars 108 are optically correct and meets ANSI (American National Standards Institute) Z87.1 2010 for optics performance. In some embodiments, the substrate 116 is a polycarbonate or other high-impact transparent material lens that meets the high-velocity impact requirements of the US military standard for ballistic eye protection MIL-PRF-32432. In some embodiments, meeting impact requirements is corroborated by tests performed in a laboratory.

In some embodiments, the ocular 108 comprises a polarizing film. The polarizing film comprises a quarter-wave plate 140 and a linear polarizer 128. Characteristics of an example of a polarizing film are:
PE: 99%
DOP: 140 nm
T %: 36%
Nb SP 45°, 135°
WL: 560 nm.

Where:
PE=polarizing efficiency;
DOP=difference of phase, in nanometer wavelength, indicates this is a quarter-wave retarder (140 nm=0.25*560 nm);
Nb SP=axis of orientation of the ¼ wave plate and corresponding angle of alignment within the lens;
T=light transmission of the polarizing film; and
WL=wavelength of light the film is centered at.

In some embodiments, the glasses 100 are made by taking a polarizing film with a quarter-wave plate at 45 degrees to a linear polarizer and applying the polarizing film to an injection molded lens used as a substrate 116. The polarizing film is applied to the front 120 side of the substrate 116 (e.g., by thermoforming or other appropriate method); placing the polarizing film in the right-handed (or left-handed) direction in both oculars 108 with both quarter-wave plates 140 similarly aligned at 45 degrees respectively to each ocular 108; and installing the oculars 108 in the frame 104 with the quarter-wave plates 140 at 45 degrees aligned to the horizontal axis 112.

Additionally, an injection-molded lens can provide a variety of tints (colors) behind the linearly-polarizing filter. In some embodiments, a film 148, such as a hardcoat, is applied on the front and/or back surfaces of the lens (e.g., to provide anti-fog, abrasion resistance, chemical resistance, oil resistance, and/or corrosion resistance).

LCD screens are found in instrumentation, navigation, guidance, and general use systems and are found almost everywhere from office phones to tactical communications instrumentation. When a linear-polarizing film in a lens of linear-polarizing eyewear is off angle (often 45 degrees or more) to a LCD screen, the screen is blacked out by the canceling effect of the polarized eyewear and polarization of light from the LCD screen.

In order to limit blackout, some eyewear manufacturers cut an orientation of linear-polarizing films at an orientation of 45 degrees. Some eyeglass manufactures reduce polarization efficiency of lenses to 65-75%, which can reduce blackout somewhat, but not necessarily entirely. Both methods also have limitations. The former still blacks out screens past a 45 degree tilt of the head, and the latter reduces polarizing efficiency of a lens and reduces, but does not necessarily eliminate, blackout of LCD screens. While both partial solutions mentioned above work moderately for fashion eyewear markets, both results are not ideal in tactical applications.

Additionally, some linear-polarizing lenses are manufactured with a "sandwich" style construction having multiple layers of polycarbonate and/or glass. One problem is that many polarized lenses do not meet high-velocity impact requirements of the military per US Military Standard for ballistic eye protection MIL-PRF-32432 (2013 edition, Jan. 9, 2013). These lens types are not used in the military today due to their issues with extinction and LCD equipment and the lack of ballistic performance. In some embodiments, the glasses 100 have a substrate 116 that complies with MIL-PRF-32432 and/or some other predetermined specification for impact resistance (e.g., ANSI Z87.1, 2010; European standard (EN 166, 169, 170, and 172)). For example, glasses 100 are ballistic eyewear designed to protect a user from small projectiles and/or fragments (e.g., such as being able to withstand a 0.15 caliber traveling at 640 feet per second; or a 0.22 caliber traveling at 550 feet per second). Other possible applications for the glasses 100 include fishing, hunting, outdoor recreation, tactical, military, shooting sports, snow sports, water sports, fashion, and others.

Figure 2:
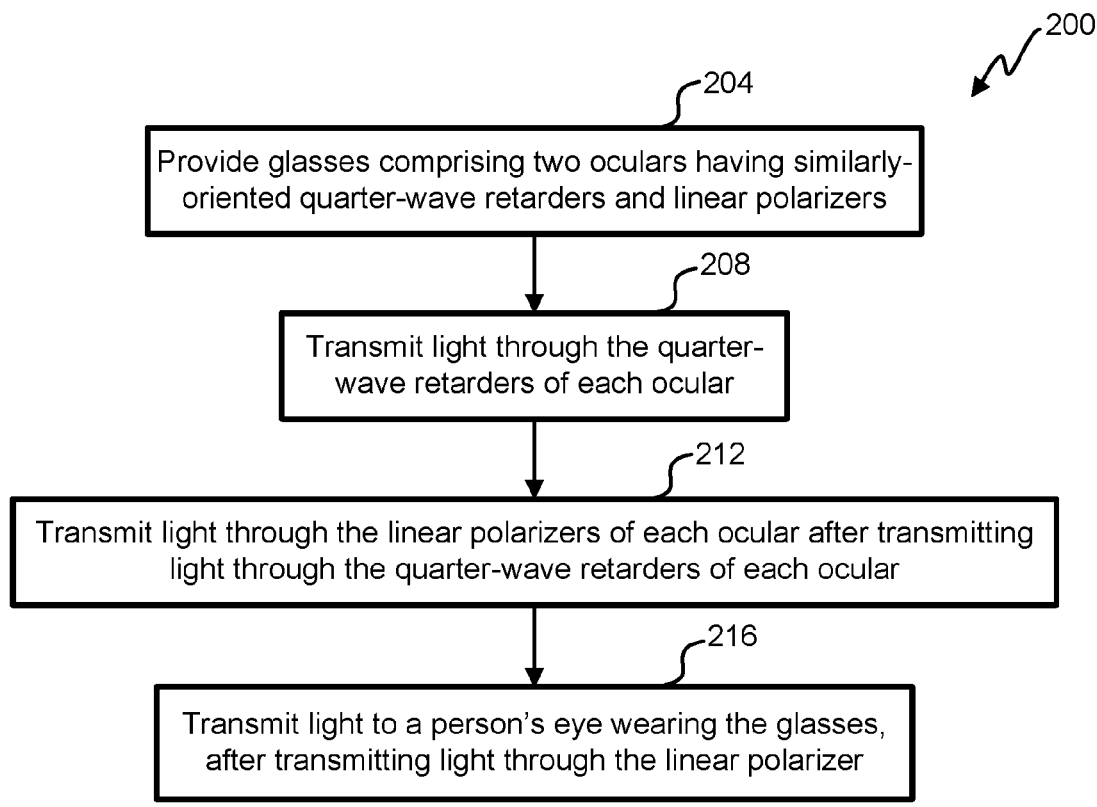
FIG. 2 presents a simplified flowchart of an embodiment of a process of using the glasses.

Referring next to FIG. 2, a flowchart of an embodiment of process 200 of using the glasses 100 is shown. The process 200 begins in step 204 by providing glasses 100 comprising two oculars 108 having similarly-oriented, quarter-wave plates 140 and linear polarizers 128. In step 208, light is transmitted through the quarter-wave plates 140 of each ocular 108. In step 212, light is transmitted through the linear polarizers 128 of each ocular 108, after transmitting light through the quarter-wave plates 140 of each ocular 108. In step 216, light is transmitted to eyes of a wearer of the glasses 100 after transmitting light through the linear polarizers 128 of each ocular 108. Light is also transmitted through a substrate 116 used to protect the eyes of the wearer of the glasses 100.

Figure 3:
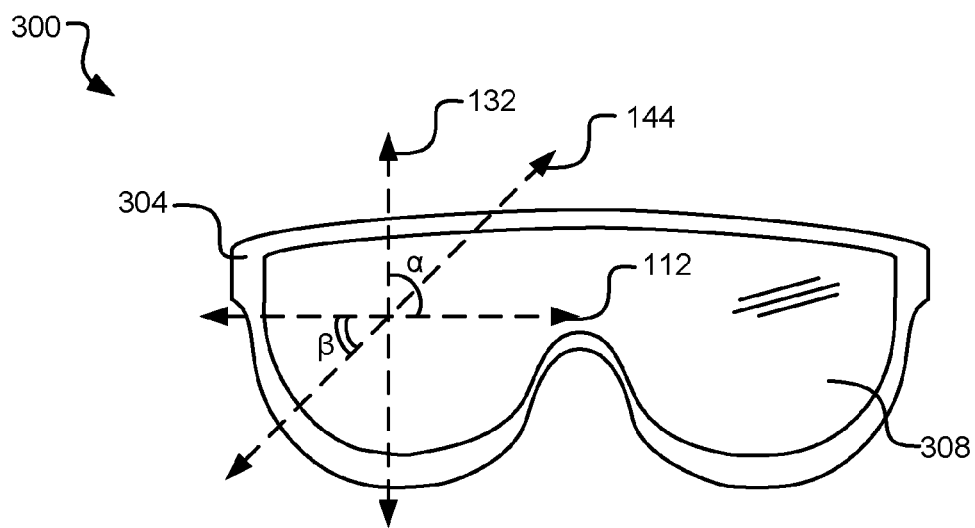
FIG. 3 depicts a simplified front view of an embodiment of goggles having a single lens.

In some embodiments, only one ocular is used for eye protection. In FIG. 3, an embodiment of glasses 300 with only one ocular is shown. The glasses 300 comprise a frame 304 and an ocular 308. In the embodiment shown, the glasses 300 are goggles (e.g., used by skiers, motorcycle riders, and/or people involved in tactical situations). There is only one ocular 308 in the frame 304. Though the glasses 300 are shown as goggles, other applications for eye protection are used in some embodiments (e.g., visor on helmets, such as jet fighter-pilot helmet, motorcycle helmet, hockey helmet; and/or motorcycle windshield). In some embodiments, lenses are used for motorcycle riding to provide some polarized filtering, but to not completely block linearly-polarized light because completely blocking linearly-polarized light (e.g., horizontally polarized) can prevent a motorcyclist from perceiving a slick spot (e.g., oil) on a road.

In some embodiments, the frame 304 is flexible. In some embodiments, the frame 304 surrounds the ocular 308. In some embodiments, the frame 304 partially surrounds the ocular 308. In some embodiments, the frame 304 comprises arms (e.g., to rest on ears to be worn like sunglasses or spectacles). In some embodiments, the frame 304 comprises a flexible strap to be worn around the head of a user.

The ocular 308 (and ocular 108) is sometimes referred to as a lens. In some embodiments, the ocular 308 uses layers similar to those discussed in conjunction with ocular 108. The ocular 308 is wide enough to cover both eyes of a user. For example, the ocular 308 has a width (a length measured along the horizontal axis 112) equal to or greater than 3, 4, or 5.5 inches and equal to or less than 10, 12, or 30 inches. In some embodiments, the ocular 308 has a width between 12 inches and 24 inches and a height (a length measured along a vertical axis orthogonal to the horizontal axis 112) to be used as a motorcycle windshield. In some embodiments, the ocular 308 has a first field of view (e.g., for passing light to a right eye of a user) and a second field of view (e.g., for passing light to a left eye of a user). In some embodiments, the first field of view overlaps with the second field of view (e.g., in a center portion of a width of the ocular 308).

In some embodiments, the ocular 308 comprises a substrate 116, a linear polarizer 128 characterized by a transmission axis 132; a quarter-wave retarder 140 characterized by a fast axis 144; and a film 148 (see, e.g., FIG. 1B). The substrate 116 has a first surface (e.g., front 120) and a second surface (e.g., back 124) opposite the first surface. In some embodiments, the second surface is an air interface (e.g., no other layers next to the second surface). In some embodiments, a film and/or coating is applied to the second surface. For example, a coating is applied for anti-fog, hardcoat, oil resistance, etc.). In some embodiments, the coating comprises two or more materials (e.g., a material for anti-fog and a material for hardcoat). In some embodiments, the coating is a single material. In some embodiments, the second surface of the substrate 116 is coated because a process used to coat a front of the ocular 308 also coats the back of the ocular 308 (e.g., dipping). In some embodiments, the film and/or coating applied to the second surface is less than 100 µm, 50 µm, and/or 15 µm thick. In some embodiments, the film and/or coating applied to the second surface is between 10 and 13 µm thick. In some embodiments, the film has a thickness greater than 0.5 µm.

The linear polarizer 128 is between the quarter-wave retarder 140 and the substrate 116. In some embodiments, the fast axis 144 makes a non-zero angle and a non 90-degree angle with the transmission axis 132. In some embodiments, the fast axis 144 also makes a non 45-degree angle with the transmission axis 132. In some embodiments, the film 148 is a hardcoat and has an air interface (e.g., object side of FIG. 1B). The film 148 is not made of polycarbonate (e.g., the film 148 does not provide structural support for the ocular 308, but rather the substrate 116 provides support for the film 148). In some embodiments, the substrate 116, alone, provides structural support and/or ballistic protection for the ocular 108 and/or the ocular 308. In some embodiments, the film 148 is made of a polymer-based or silica-based material providing special features to the lens (e.g., for abrasion, oil, and/or chemical resistance). In some embodiments, the film 148 is applied by spin-coating, flow-coating, dipping, or other suitable technique for this purpose. In some embodiments, the film 148 and/or a different coating is applied to the back 124 of the substrate 116 and/or ocular 108.

In some embodiments, the substrate 116 is the only element of the ocular 308 (and ocular 108) made of polycarbonate. In some embodiments, the substrate 116 is the only element of the ocular 308 made of polycarbonate, polyurethane, or other high-impact resistant transparent material. In some embodiments, only the substrate 116 is polycarbonate to avoid birefringence effects seen by a user (e.g., birefringence effects can be seen when a polycarbonate lens is sandwiched between a polarized light source and a polarizer). In some embodiments, the substrate has a thickness (measured in a direction of light travel 152) from 2.0 mm to 2.4 mm, from 1.8 mm to 3.5 mm, 3.2 mm, or 2.2 mm for glasses and/or goggles. In some embodiments, the substrate has a thickness from 5 to 15 mm (e.g., 12 mm) for shields and/or visors. Such thicknesses have been found to be good tradeoffs between optical clarity of the substrate 116 and impact resistance of the substrate 116. Some lenses are made with two polycarbonate substrates, each 1 mm thick, with a polarizer between the two polycarbonate substrates. However, one thick polycarbonate substrate (e.g., 2 mm thick) has better ballistic/impact protection than two thinner polycarbonate substrates having a combined thickness equal to the one thick polycarbonate substrate. In some embodiments, a polycarbonate substrate having a thickness of 1.8 mm to 2.5 mm can stop a projectile (e.g., 0.15 caliber, 5.8 grain, T37 shaped; approximately 3.8 mm, 0.376 g) traveling at 450 miles per hour (640 to 660 feet per second; approximately 201 m/s), whereas two thinner substrates tend to shatter.

Figure 4:
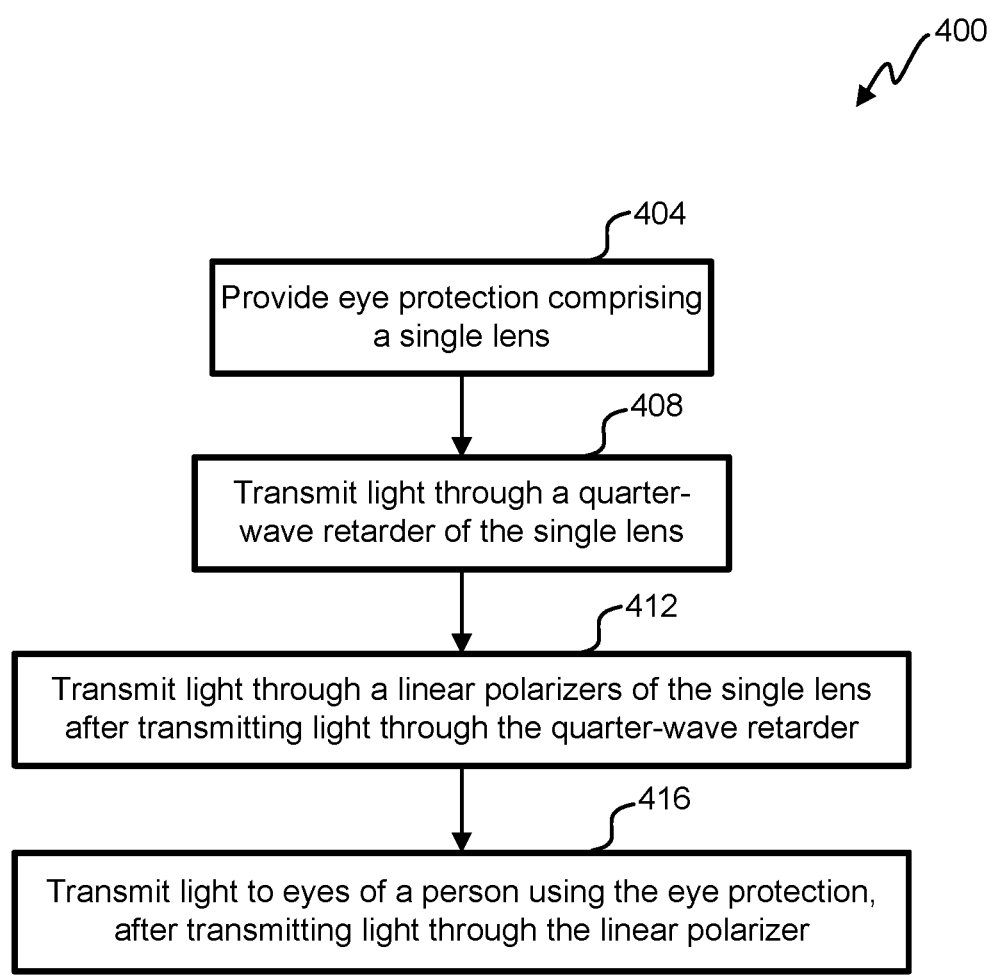
FIG. 4 presents a simplified flowchart of an embodiment of a process of using the single lens.

FIG. 4 presents a simplified flowchart of an embodiment of a process 400 of using the single lens as eye protection. The process begins in step 404 with providing eye protection comprising a single lens. For example glasses 300 are provided. The eye protection comprises a single lens (e.g., ocular 308). The single lens comprises a substrate 116, a quarter-wave retarder 140, and a linear polarizer 128. The eye protection is positioned in relation to a user (e.g., worn by the user), such that both eyes of the user look through the single lens. In step 408, light traveling to the user is transmitted through the quarter-wave retarder 140 of the single lens. In step 412, light traveling to the user, after transmitting through the quarter-wave retarder, is transmitted through the linear polarizer of the single lens. In step 416, light traveling to the user is transmitted through the linear polarizer before entering an eye of the user. The eye protection provides ballistic protection to the user. In some embodiments, the ocular 308 of the single lens has similar thicknesses as the ocular 108 of the glasses 100. In some embodiments, the ocular 308 of the glasses 300 is thicker than the ocular 108 of the glasses 100. In some embodiments, the single lens has a width (e.g. as measured along the horizontal axis 112) ranging from 4 inches to 12 inches. In some embodiments, the substrate has a thickness equal to or greater than 2.0 mm and equal to or less than 3.5 mm. The single lens has a first field of view (e.g., for a left eye of the user) and a second field of view (e.g., for a right eye of the user). A field of view is an area of the single lens that an eye of the user can look through while wearing the eye protection. The eye protection has only one substrate 116 (e.g., as opposed to glasses that "sandwich" a polarizer between two substrates).

The above description of exemplary embodiments of the invention has been presented for the purposes of illustration and description. It is not intended to be exhaustive or to limit the invention to the precise form described, and many modifications and variations are possible in light of the teachings above. For example, the linear polarizer 128 could be behind the substrate 116 and the quarter-wave plate 140 in front of the substrate 116. But in some embodiments, the linear polarizer 128 is not placed behind the substrate 116 if the substrate is made of a material having birefringence properties, which effects would show up as color variations to a wearer when looking at polarized light (e.g., looking at light from an LCD screen). Additionally, other materials for the oculars 108 could be between and/or in addition to the substrate 116, the linear polarizer 128, the quarter-wave plate 140, and/or the film 148. Also, in some embodiments, the frame 104 and/or oculars 108 are curved to provide more protection to the wearer of the glasses 100. In some embodiments, the glasses 100 are tinted to reduce glare (e.g., from the sun). In some embodiments, the glasses 100 are used as sunglasses. In some embodiments, makers of a display apply a film that changes linearly-polarized light into circularly-polarized light; for example, changing linearly-polarized light from an LCD screen to right-handed, circularly-polarized light. In such a situation, in some embodiments, the oculars 108 are configured to pass right-handed, circular-polarized light. In some embodiments, the oculars 108 are configured to pass left-handed, circular-polarized light. In some embodiments, an angle between the transmission axis 132 and the fast axis 144 is something less than 45, and/or the quarter-wave plate 140 is changed to a retarder that is less than or greater than a quarter-wave. For example, the absolute value, $|\alpha-\beta|$, is equal to or between 10° and/or 40°, or 50° and/or 80° (e.g., 22.5° plus or minus 5°). Such a configuration would preferentially block horizontally-polarized light (though not blocking horizontally-polarized light completely) and not black out circular-polarized light. Further, "first" and "second" are used in this application to distinguish between similar elements and/or components and not to establish a sequential order, unless specifically indicated to the contrary.

The embodiments were chosen and described in order to explain the principles of the invention and practical applications to thereby enable others skilled in the art to best utilize the invention in various embodiments and with various modifications as suited to the particular use contemplated.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

Also, it is noted that the embodiments may be described as a process, which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged, unless indicated to the contrary. A process is terminated when its operations are completed, but could have additional steps not included in the figure. A process may correspond to a method, a function, a procedure, a subroutine, a subprogram, etc.

A recitation of "a", "an", or "the" is intended to mean "one or more" unless specifically indicated to the contrary.

All patents, patent applications, publications, and descriptions mentioned here are incorporated by reference in their entirety for all purposes. None is admitted to be prior art.

What is claimed is:

1. Eye protection comprising:
    a frame; and
    a single lens coupled with the frame, wherein the single lens is configured to protect both eyes of a user using the eye protection, the single lens comprising:
        a substrate, wherein:
            the substrate has a first surface;
            the substrate has a second surface; and
            the substrate is made of polycarbonate;
        a linear polarizer characterized by a transmission axis; and
        a quarter-wave retarder, wherein:
            the linear polarizer is between the first surface of the substrate and the quarter-wave retarder;
            the quarter-wave retarder is characterized by a fast axis; and
            the fast axis makes a non-zero angle and less than a 45-degree angle with the transmission axis.

2. The eye protection as recited in claim 1, the single lens further comprising a film directly adjacent to the quarter-wave retarder, wherein:
    the quarter-wave retarder is between the film and the linear polarizer;
    the film is a hardcoat; and
    the film has an air interface.

3. The eye protection as recited in claim 2, wherein the film has a thickness between 2 and 10 microns.

4. The eye protection as recited in claim 1, wherein the substrate is the only part of the single lens made of polycarbonate or glass.

5. The eye protection as recited in claim 1, wherein the substrate has a thickness equal to or greater than 1.8 mm and equal to or less than 2.5 mm.

6. The eye protection as recited in claim 1, wherein the single lens has a width ranging from 4 inches to 12 inches.

7. The eye protection as recited in claim 1, wherein the eye protection provides ballistic protection to the user.

8. The eye protection as recited in claim 1, wherein the fast axis makes an angle with the transmission axis, and the angle is 22.5 degrees, plus or minus 5 degrees.

9. A method for using eye protection, the method comprising:
   providing eye protection, wherein:
      the eye protection comprises a single lens;
      the single lens comprises:
         a substrate;
         a quarter-wave retarder; and
         a linear polarizer; and
   positioning the eye protection in relation to a user such that:
      both eyes of the user look through the single lens;
      light traveling to the user is transmitted through the quarter-wave retarder of the single lens;
      light traveling to the user, after transmitting through the quarter-wave retarder, is transmitted through the linear polarizer of the single lens, wherein a fast axis of the quarter-wave retarder make a non-zero angle and less than a 45-degree angle with a transmission axis of the linear polarizer; and
      light traveling to the user is transmitted through the linear polarizer and the substrate before entering eyes of the user.

10. The method for using eye protection as recited in claim 9, wherein the eye protection provides ballistic protection to the user.

11. The method for using eye protection as recited in claim 9, wherein the single lens has a width ranging from 4 inches to 12 inches.

12. The method for using eye protection as recited in claim 9, wherein the substrate has a thickness equal to or greater than 2.0 mm and equal to or less than 2.4 mm.

13. The method for using eye protection as recited in claim 9, wherein:
   the substrate has a first surface and a second surface opposite the first surface;
   the linear polarizer is between the quarter-wave retarder and the first surface; and
   the eye protection is positioned in relation to the user such that the second surface of the substrate is nearer an eye of the user than the first surface of the substrate.

14. The method for using eye protection as recited in claim 9, wherein the substrate is made of polycarbonate.

15. The method for using eye protection as recited in claim 9, wherein the substrate is the only part of the single lens made of polycarbonate or glass.

16. The method for using eye protection as recited in claim 9, wherein the fast axis makes an angle with the transmission axis, and the angle is 22.5 degrees, plus or minus 5 degrees.

17. Eye protection comprising:
   a frame; and
   a lens coupled with the frame, wherein the lens is a single lens of the eye protection and configured to protect both eyes of a person using the eye protection, the lens comprising:
      a substrate, wherein:
         the substrate comprises a first surface;
         the substrate comprises a second surface;
         the substrate is made of polycarbonate;
         the substrate is the only part of the single lens made of polycarbonate; and
         the substrate has a thickness equal to or greater than 1.8 mm and equal to or less than 2.5 mm to provide impact resistance;
      a linear polarizer characterized by a transmission axis;
      a quarter-wave retarder, wherein:
         the linear polarizer is between the first surface of the substrate and the quarter-wave retarder;
         the quarter-wave retarder is characterized by a fast axis; and
         the fast axis makes an angle with the transmission axis, and the angle is 22.5 degrees, plus or minus 5 degrees; and
      a film directly adjacent to the quarter-wave retarder, wherein:
         the quarter-wave retarder is between the film and the linear polarizer; and
         the film comprises an air interface.

18. The eye protection of claim 17, wherein the film has a thickness equal to or less than 50 μm.

19. The eye protection of claim 17, wherein the second surface of the substrate is an air interface.

20. The eye protection of claim 17, wherein the film is a hardcoat.

* * * * *